(12) United States Patent
Brunotte

(10) Patent No.: US 9,356,544 B2
(45) Date of Patent: May 31, 2016

(54) CONTROL DEVICE FOR ELIMINATING MALFUNCTIONS IN A NETWORK

(71) Applicant: SIEMENS AKTIENGESELLSCHAFT, München (DE)

(72) Inventor: Christoph Brunotte, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/405,319

(22) PCT Filed: May 8, 2013

(86) PCT No.: PCT/EP2013/059585
§ 371 (c)(1),
(2) Date: Dec. 3, 2014

(87) PCT Pub. No.: WO2013/182368
PCT Pub. Date: Dec. 12, 2013

(65) Prior Publication Data
US 2015/0115853 A1    Apr. 30, 2015

(30) Foreign Application Priority Data

Jun. 4, 2012  (DE) .......................... 10 2012 209 369

(51) Int. Cl.
| H02P 6/10 | (2006.01) |
| H02J 3/18 | (2006.01) |
| H02P 23/04 | (2006.01) |
| H02P 27/06 | (2006.01) |

(52) U.S. Cl.
CPC ................. *H02P 6/10* (2013.01); *H02J 3/1835* (2013.01); *H02P 23/04* (2013.01); *H02P 27/06* (2013.01); *Y02E 40/30* (2013.01)

(58) Field of Classification Search
CPC ..................................... H02P 6/10; H02P 6/08
USPC ................... 318/400.01, 400.21, 400.23, 700
See application file for complete search history.

(56) References Cited

U.S. PATENT DOCUMENTS

| 5,298,841 A * | 3/1994 | Katayama ................. H02P 6/06 318/268 |
| 6,069,467 A * | 5/2000 | Jansen ..................... H02P 6/183 318/801 |
| 2008/0157710 A1* | 7/2008 | Tobari ................. H02P 21/0035 318/801 |
| 2010/0308757 A1 | 12/2010 | Kim |
| 2011/0175556 A1 | 7/2011 | Tobari et al. |
| 2011/0241586 A1* | 10/2011 | Tobari ..................... H02P 21/06 318/400.23 |
| 2012/0306411 A1 | 12/2012 | Tadano |
| 2013/0300327 A1* | 11/2013 | Sekimoto ................ H02M 1/12 318/400.23 |

FOREIGN PATENT DOCUMENTS

| EP | 0 033 842 A2 | 8/1981 |
| EP | 0 610 671 A1 | 8/1994 |
| EP | 1 548 278 A2 | 6/2005 |
| EP | 2 023 480 A2 | 2/2009 |
| EP | 2 164 165 A1 | 3/2010 |
| JP | 2009 296752 A | 12/2009 |
| RU | 2092967 C1 | 10/1997 |
| RU | 2132110 C1 | 6/1999 |
| WO | WO 01/73518 A1 | 10/2001 |
| WO | WO 2009-057188 A1 | 5/2009 |
| WO | WO 2011/105355 A1 | 9/2011 |

* cited by examiner

*Primary Examiner* — Kawing Chan
(74) *Attorney, Agent, or Firm* — Henry M. Feiereisen LLC

(57) ABSTRACT

Electrical malfunctions in a network which are caused by torque fluctuations of an electric motor, in particular flicker, are reduced by using a control device. For simple and cost-effective minimizing or even correction of such malfunctions with the control device, the control device has at least one first input for supplying an input signal which contains information suitable for determining the loading of the network by torque fluctuations and at least one output for transmitting an output signal to at least one converter supplying the electric motor. This makes it possible to reduce or ideally to eliminate electrical malfunctions in a network which are caused by torque fluctuation of the electric motor.

5 Claims, 3 Drawing Sheets

CONTROL DEVICE FOR ELIMINATING MALFUNCTIONS IN A NETWORK

CROSS-REFERENCE TO RELATED APPLICATIONS

This application is the U.S. National Stage of International Application No. PCT/EP2013/059585, filed May 8, 2013, which designated the United States and has been published as International Publication No. WO 2013/182368 and which claims priority of German Patent Application, Serial No. 10 2012 209 369.9, filed Jun. 4, 2012, pursuant to 35 U.S.C. 119(a)-(d).

BACKGROUND OF THE INVENTION

The invention relates to a control device for reducing electrical malfunctions in a network which are caused by torque fluctuations of an electric motor, in particular flicker. The invention also relates to a system having a control device of this type and to a method for reducing electrical malfunctions which are caused by torque fluctuations of an electric motor, in particular flicker, in a network by means of a control device of this type.

One cause of malfunctions, for example flicker, in a network is torque fluctuations in drive devices which are electrically connected to the network. In a drive device, an electric motor which is supplied via a converter is coupled to a mechanical load or a mechanical source. Malfunctions can arise when the mechanical load, for example a piston compressor, or the mechanical source, such as an internal combustion engine has a varying torque pattern. This leads to variations in the network current which can then cause malfunctions in the network. The electric motor can be operated either as a motor, so that it converts electrical energy into mechanical energy in order thereby to drive a load, or it can be operated as a generator when it converts mechanical energy into electrical energy in order thereby to generate electrical energy. The converter serves to control the energy flow. A converter control system is associated with the converter, inter alia, for receiving target value signals. It can be arranged in the immediate vicinity of, particularly in a common switchgear cabinet together with, the converter or spatially separate therefrom. An uneven mechanical loading on the motor shaft, which is caused, for example, by the operation of a piston compressor, leads to an uneven electrical loading on the network, which can manifest itself in the form of network malfunctions such as flicker. The uneven mechanical loading of the electrical motor can be buffered and reduced in that a large inertial mass is used on the motor shaft. This reduces the interfering effects on the electrical side of the electric motor. However, the inertial mass increases the structural volume, the weight and thus also the costs of the motor unit, sometimes even significantly.

It is an object of the invention to minimize and ideally to eliminate, by simple and inexpensive means, electrical malfunctions arising from torque fluctuations during operation of a load or a source at an electric motor which is electrically supplied by means of a converter connected to the network.

SUMMARY OF THE INVENTION

This object is achieved by means of a control device for reducing electrical malfunctions in a network which are caused by torque fluctuations of at least one electric motor, in particular flicker, wherein the control device comprises at least one first input for supplying an input signal which contains information suitable for determining the loading of the network by torque fluctuations and at least one output for outputting an output signal to at least one converter supplying the electric motor to reduce the electrical malfunctions in the network caused by torque fluctuations of the electric motor.

This object is further solved by a system having at least one electric motor, a converter supplying the at least one electric motor, and at least one control device for reducing electrical malfunctions in a network caused by torque fluctuations of the at least one electric motor, wherein the control device includes at least one first input for supplying an input signal with information suitable for determining loading of the network by torque fluctuations, and at least one output for outputting an output signal to at least one converter supplying the electric motor for reducing the electrical malfunctions in the network caused by the torque fluctuations of the electric motor, and by a method for eliminating electrical malfunctions in a network with a control device, wherein the method includes receiving with a controller of the control device at least one first input signal which comprises information suitable for determining loading of the network by torque fluctuations associated with at least one electric motor, generating with the controller from the at least one first input signal at least one output signal, and transmitting the at least one output signal to a converter supplying the at least one electric motor.

The invention is based on the recognition that malfunctions in the network can be minimized or even eliminated through the processing of information regarding the loading of the network by torque fluctuations, by surprisingly simple means.

The control device intervenes in the interplay of mechanical energy and electrical energy, wherein the converter acts as the actuating element in this arrangement. For this purpose, the control device receives suitable information on the loading of the network as the input variable. In order to counteract this loading of the network, depending on the input signal, a corresponding output signal is generated and is transferred to the converter as the actuating element. The main advantage of a control system of this type is that inertial masses can be dispensed with or at least reduced. Aside from a reduced weight and reduced costs, in this way, at the same time, a large dynamic range of the drive can be achieved.

Advantageous developments of the invention are disclosed in the dependent claims.

In an advantageous embodiment, the input signal contains information on the electric power absorbed by or fed in by the at least one electric motor from the network or on the currents and/or voltages applied to the electric motor. These variables are particularly well suited for determining the loading of the network through torque fluctuations. The determination can be carried out, for example, by means of calculations or estimations. One advantage of these variables is that these can be made available relatively simply with suitable measuring devices. This embodiment is particularly advantageous if corresponding measuring devices are already present in the system for other regulation, control or monitoring tasks, so that the relevant variables can be easily fed to the control device.

In a further advantageous embodiment, the control device has at least one further input for supplying a further input signal which contains mechanical information derived from the electric motor, in particular regarding the rotary speed and/or the rotor angle. From this information, a relationship between the loading on the network and the rotor angle can be obtained. This relationship can be used to make the regulation operate in a frequency-selective manner. This has the great advantage, inter alia, that the adjustment dynamics are used for the frequency components with which action can be most effectively taken against the malfunction.

In a further advantageous embodiment, the regulating system has means for frequency analysis provided for processing the input signals. This has the great advantage, inter alia, that the adjustment dynamics are used for those frequency components with which action can be most effectively taken against the malfunction.

In a further advantageous embodiment, the output signal contains information on the target torque and/or on the voltages of the converter. The advantage of this embodiment is that the control device can easily be connected to the converter control system since the converter control system often has an input for a torque target value. The advantage of the voltage outputs lies in the formation of different existing regulating circuits separately in order to be able also to optimize them separately. For this purpose, for example, a rotary speed regulation uses the input of the converter control system for the torque target value, whereas the control device for reducing malfunctions in the network acts upon the voltages of the converter. Thus a separation of the regulating tasks is possible and the individual tasks can each be optimized separately.

In another advantageous embodiment, the system has a motor regulator for rectifying malfunctions in the network. The advantage of this arrangement is that existing regulating systems with motor regulators, for example, with the aim of regulating the rotary speed, can also be enhanced with a control device according to the invention in order to rectify malfunctions caused by the torque fluctuations. This enhancement with a control device in order to eliminate malfunctions can possibly also take place retrospectively.

In another advantageous embodiment, the system has a coupling unit for coupling the output signal of the control device and the output signal of the motor regulator. The advantage of this embodiment is that the control device is integrated as simply as possible into a corresponding system, possibly also into an existing system. Existing outputs of a motor controller are coupled by simple means to the outputs of the control device via the coupling unit, in order to feed these outputs to the converter control system. Particularly for retrospective enhancements of the system with a control device for reducing malfunctions in the network, by this means, simple integration is enabled. With this enhancement, the converter control system does not need to be extended with further inputs.

In a further advantageous embodiment, a high-pass filter is used for filtering the input signal of the electrical power. This ensures, inter alia, that changes to a rotary speed target value are not interpreted by the controller as a malfunction. In this way, the interaction of different control circuits is prevented as far as possible. Furthermore, low-frequency components of the torque at the electric motor are kept out of the calculation of the control signal for the malfunction reduction. These portions could possibly evoke imprecision in the determination of the output signal. The advantage of this embodiment is a higher level of accuracy in the determination of the control signal of the control system.

In a further advantageous embodiment, the control device, the motor controller, the converter control system, the high-pass filter and/or the coupling unit are grouped altogether or in parts to an overall control unit. Since the different control tasks can be established by different software portions on the same hardware unit, this grouping together results in a reduction in hardware complexity and thus, in part, a distinct reduction in costs.

BRIEF DESCRIPTION OF THE DRAWING

The invention will now be described and explained in greater detail making reference to the exemplary embodiments illustrated in the drawings, in which.

DETAILED DESCRIPTION OF PREFERRED EMBODIMENTS

Figure 1:
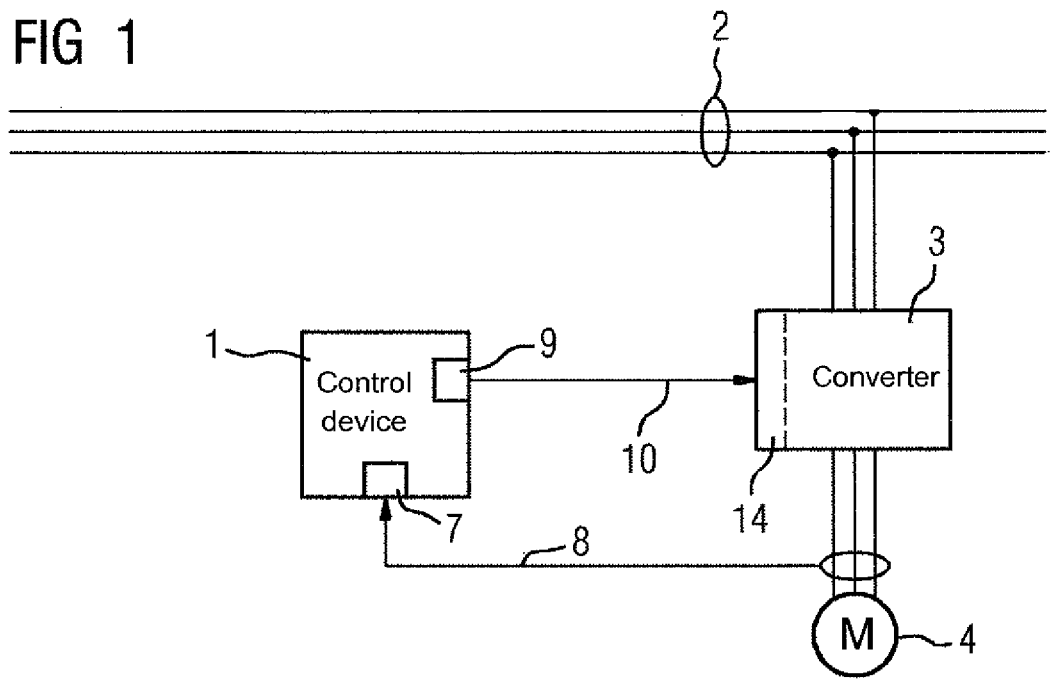
FIG. 1 shows a first block circuit diagram of a system with an electric motor supplied via a converter, and a control device.

FIG. 1 shows a first block circuit diagram of a system with an electric motor 4 supplied via a converter 3, and a control device 1. The main components of the system include a network 2 for the exchange of electrical energy, a converter 3 which supplies an electric motor 4, and a control device 1. A converter control system 14 is a functional part of the converter 3. In order to reduce or eliminate malfunctions in the network 2 arising due to torque fluctuations at the electric motor 4, an input signal 8 is transmitted at an input 7 of the control device 1 with which the loading on the network 2 due to torque fluctuations of the electric motor 4 can be determined. For this purpose, the control device 1 generates an output signal 10 at the output 9 of the control device 1 which is suitable, with the aid of the converter 3, for counteracting the malfunctions. This output signal 10 is fed to the converter control system 14 of the converter 3.

Figure 2:
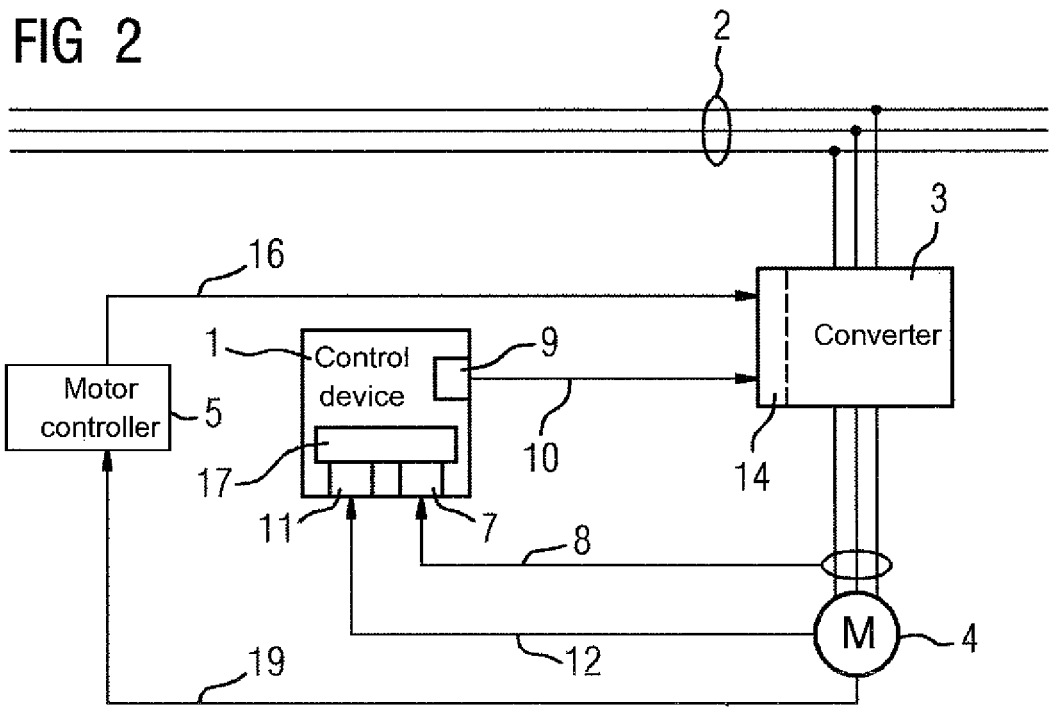
FIG. 2 shows a further block circuit diagram of a system according to FIG. 1, extended with a motor controller and a further input for the control device.

FIG. 2 shows a further block circuit diagram of a system according to FIG. 1, extended with a motor controller 5 and a further input 11 for feeding a further input signal 12 for the control device 1. In this regard, embodiments can also be realized which comprise only one of these two elements as an enhancement. With regard to the other components of the system, reference is made to the description regarding FIG. 1 and the reference signs therein. An input signal 12 which contains information on the rotary speed and/or the rotary angle of the electric motor 4 is fed to the control device 1 at a further input 11. The means 17 for frequency analysis contained in the control device 1 can break down the input signal 8 into different frequency components, based on the further input signal 12. The further input signal 12 contributes to determining the relevant frequencies for the frequency analysis. These are, in particular, the fundamental frequency which corresponds to the mechanical motor frequency, and the relevant harmonics. The output 9 of the control device 1 transmits an output signal 10 to the converter control system 14 containing only a limited number of frequencies. Even with only portions of the fundamental frequency, satisfactory control results can be achieved. Each further frequency component improves the control behavior. In this way, the adjustment dynamics are used for the frequencies with which the converter is able to act most effectively against the malfunction. The motor controller 5 serves to set the operational working point, for example, a rotary speed of the electric motor 4. For this purpose, the motor controller 5 requires an input signal 19 from the electric motor 4, in this example, a rotary speed signal. As the output signal 16, the motor controller 5 makes a target value available to the converter 3 in order to regulate the electric motor 4 to the intended working point.

Figure 3:
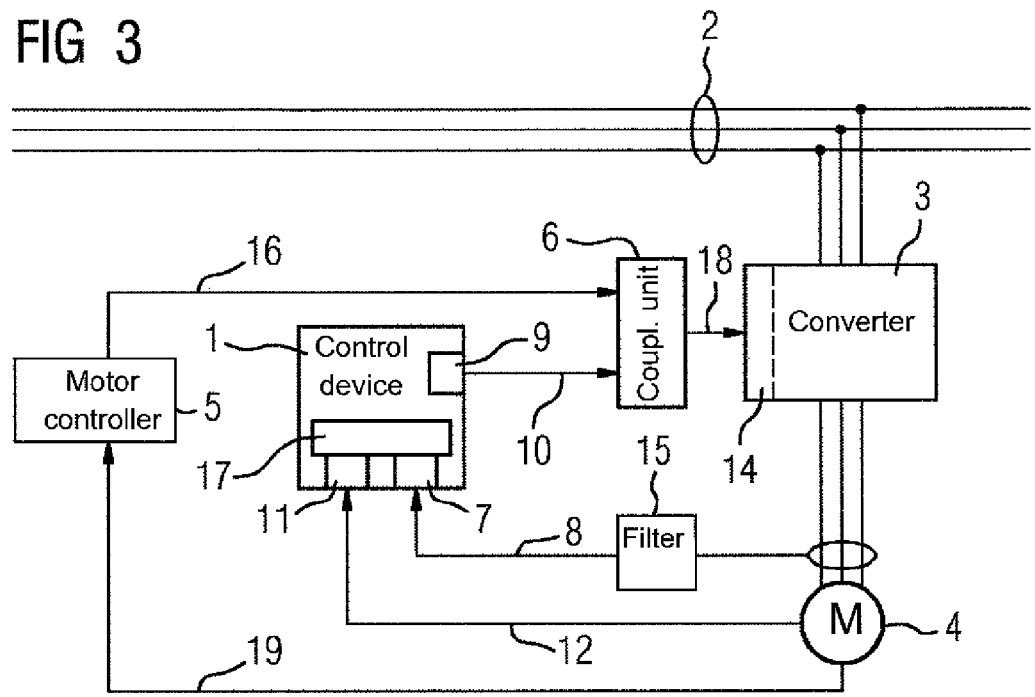
FIG. 3 shows a further block circuit diagram of a system according to FIG. 2, extended with a coupling unit, a high-pass filter and means for frequency analysis.

FIG. 3 shows a further block circuit diagram of a system according to FIG. 1 and FIG. 2 so that, for the avoidance of repetition, reference is made, with regard to matching components of the system, to the descriptions regarding FIG. 1 and FIG. 2 and the reference signs used there. For the further optimization of the regulating behavior, FIG. 3 also includes a high-pass filter 15 for processing the input signal 8 and a coupling unit 6. In this regard, embodiments can also be realized which comprise one of these two elements as an extension.

The coupling unit 6 links the output signal 10 of the control device 1 and the output signal 16 of the motor controller 5 to one another and generates an output signal 18 of the coupling unit 6, which is transferred to the converter control system 14 of the converter 3 in order to control the electric motor 4. The system has the advantage that the converter control system 14 must accept only one signal. An extension to a second input for the converter control system 14 can be dispensed with, so that even existing systems can be enhanced with a control device to remedy malfunctions in the network. The high-pass filter 15 serves to process the input signal 8 of the control device 1 before the feeding of the signal into the control device 1. Herein, the low frequency components are removed from the signal. This ensures, inter alia, that control functions of the motor controller, such as the intentional changing of the rotary speed, are not interpreted by the control device 1 as a malfunction. In this way, the interaction of different control circuits is prevented to the greatest possible extent. The portions causing the malfunctions then remain in the input signal 8. Thus, the determination of the output signal 10 of the control device 1 can be carried out more simply, with less effort and more precisely.

Figure 4:
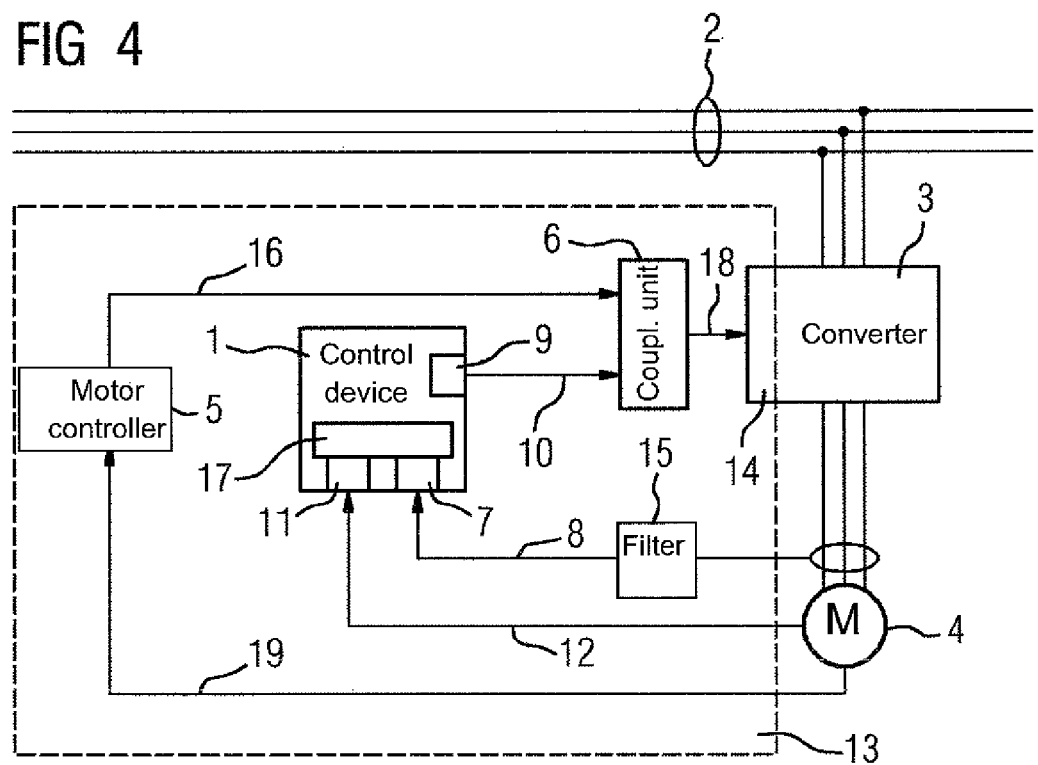
FIG. 4 shows a further block circuit diagram of a system according to FIG. 3, wherein parts of the control system are grouped together into an overall control system.

FIG. 4 shows a further block circuit diagram of a system according to FIG. 1, FIG. 2 and FIG. 3 so that, for the avoidance of repetition, reference is made in turn, with regard to matching components of the system, to the descriptions regarding FIGS. 1 to 3 and the reference signs used there.

The peculiarity of the exemplary embodiment of FIG. 4 lies therein that the regulating components of the system, such as the control device 1, the converter control system 14, the motor controller 5, the high-pass filter 15 and the coupling unit 6 are grouped together into an overall control unit 13. The different components are often only different software routines which, however, can be executed on the same regulating hardware. Therefore, different hardware units are not necessarily needed for the individual regulating components. The assembly of the different software routines on a hardware unit leads, in many cases, to a reduction of costs.

Figure 5:
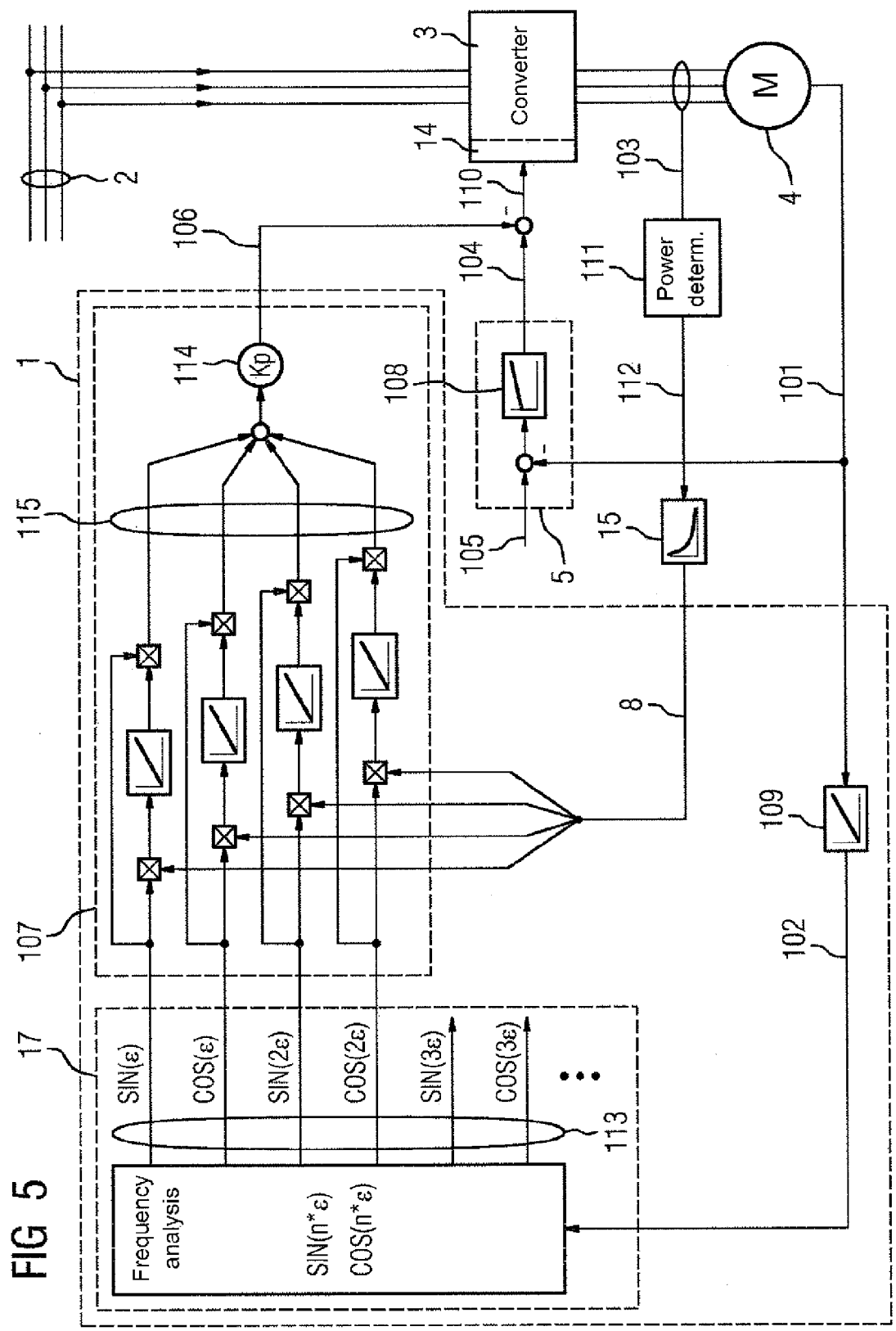
FIG. 5 shows an overall block circuit diagram of .a system according to the invention.

FIG. 5 shows a further exemplary embodiment of a system according to the invention. A converter 3 connected to the network 2 supplies an electric motor 4. For regulation of a motor rotary speed, a motor controller 5 is used which as input variables receives, as the actual value, a rotary speed signal 101 from the electric motor 4 and as the target value, a rotary speed target value 105. Within the motor controller 5, the difference is formed from the two fed-in values and is passed to a rotary speed regulator 108, for example, a PI regulator. The rotary speed regulator 108 generates a torque target value 104 which then simultaneously represents the output signal 16 of the motor controller. As previously shown and described in relation to FIGS. 1 to 4, for the suppression of the malfunctions in the network 2, in addition to the motor controller 5, a control device 1 is also provided. From information 103 at the electric motor 4, in particular from voltage(s) and current(s), a power signal 112 is generated through means 111 for power determination. A high-pass filter 15 removes the low-frequency component so that the input signal 8 of the control device 1 receives only the power portions giving rise to the malfunctions in the network 2. This ensures, inter alia, that control functions of the motor controller 5, such as the changing of the rotary speed, are not interpreted by the control device 1 as a malfunction. In this way, the interaction of different control circuits is prevented to the greatest possible extent. Within the control device 1, the input signal 8 is fed to a power oscillation regulator 107. In order to be able to carry out a frequency analysis which relates to the fundamental frequency and the harmonics of the mechanical motor frequency, the mechanical rotor angle 102 is formed from the rotary speed signal 101 with the aid of an integrator 109 and is fed to the means 17 for frequency analysis. Said means generates auxiliary signals 113 for frequency analysis from sine and cosine values of the mechanical rotor angle 102 and its multiples. In principle, any desired number of harmonics can be used for the frequency-selective regulation. Sufficiently good regulation results have been achieved for the fundamental oscillation. FIG. 5 shows the additional use of the 1st harmonic, which has also proved to be useful. The individual auxiliary signals 113 for frequency analysis are multiplied in the power oscillation regulator 107, in each case by the input signal 8, then subsequently integrated, thereafter to be multiplied by the respective same auxiliary signals 113 for frequency analysis, as before. The result is individual additional torque portions 115, the total of which is fed to a proportional member 114 which optimizes the regulating behavior by means of multiplication by a constant factor. The resulting output signal is the additional torque target value 106 which corresponds to the output signal 10 of the control device 1. The additional torque target value 106 is overlaid negatively onto the target torque 104 and is fed as the overall target torque 110 to the converter control system 14.

What is claimed is:

1. A method for eliminating electrical malfunctions in a network with a control device, the method comprising:
   receiving with a controller of the control device at least one first input signal which is formed from a power signal that is generated from information obtained at an electric motor with a device for power determination,
   receiving with the controller at least one additional input signal comprising mechanical information derived from the electric motor, wherein the mechanical information relates to at least one of a rotation speed and a rotor angle of the electric motor,
   removing high-frequency components in the at least one first input signal by high-pass filtering,
   forming from the at least one additional input signal relating to the rotation speed through integration a mechanical rotor angle,
   multiplying auxiliary signals formed from sine and cosine values of the mechanical rotor angle and its multiples with the at least one high-pass-filtered first input signal,
   integrating the multiplied auxiliary signals and multiplying the integrated multiplied auxiliary signals again with the auxiliary signals to form additional torque portions,
   forming from the additional torque portions an additional torque target value,
   generating with the controller from the additional torque target value at least one output signal of the control device, superimposing a negative value of the additional torque target value onto a target torque to generate an overall target torque, and supplying the overall target torque to a converter control system of a converter that is connected to a network and powers the electric motor.

2. The method of claim 1, further comprising regulating a rotation speed of the electric motor based on an input signal representing an actual rotary speed signal from the electric motor and a target value representing a rotary speed target value for the electric motor, and generating as an output signal the target torque.

3. A control device for reducing electrical malfunctions in a network caused by torque fluctuations of at least one electric motor, the control device comprising:

at least one first input for receiving at least one first input signal which is formed from a power signal that is generated from information obtained at the electric motor with a device for power determination, at least one additional input for receiving at least one additional input signal comprising mechanical information derived from the at least one electric motor, wherein the mechanical information relates to at least one of a rotation speed and a rotor angle of the electric motor, and at least one output for outputting an output signal to at least one converter powering the electric motor for reducing the electrical malfunctions in the network caused by the torque fluctuations of the electric motor, wherein the control device is configured to remove high-frequency components in the at least one first input signal by high-pass filtering, form from the at least one additional input signal relating to the rotation speed through integration a mechanical rotor angle, multiply auxiliary signals formed from sine and cosine values of the mechanical rotor angle and its multiples with the at least one high-pass-filtered first input signal, integrate the multiplied auxiliary signals and multiplying the integrated multiplied auxiliary signals again with the auxiliary signals to form additional torque portions, form from the additional torque portions an additional torque target value, generate from the additional torque target value at least one output signal of the control device, superimpose a negative value of the additional torque target value onto a target torque to generate an overall target torque, and supply the overall target torque as the output signal to the at least one converter.

4. A system having at least one electric motor powered by a converter and at least one control device, wherein the control device comprises at least one first input for receiving at least one first input signal which is formed from a power signal that is generated from information obtained at the electric motor with a device for power determination, at least one additional input for receiving at least one additional input signal comprising mechanical information derived from the at least one electric motor, wherein the mechanical information relates to at least one of a rotation speed and a rotor angle of the electric motor, and at least one output for outputting an output signal to at least one converter powering the electric motor for reducing the electrical malfunctions in the network caused by the torque fluctuations of the electric motor, wherein the control device is configured to remove high-frequency components in the at least one first input signal by high-pass filtering, form from the at least one additional input signal relating to the rotation speed through integration a mechanical rotor angle, multiply auxiliary signals formed from sine and cosine values of the mechanical rotor angle and its multiples with the at least one high-pass-filtered first input signal, integrate the multiplied auxiliary signals and multiplying the integrated multiplied auxiliary signals again with the auxiliary signals to form additional torque portions, form from the additional torque portions an additional torque target value, generate from the additional torque target value at least one output signal of the control device, superimpose a negative value of the additional torque target value onto a target torque to generate an overall target torque, and supply the overall target torque as the output signal to the at least one converter.

5. The system of claim 4, further comprising at least one additional motor controller configured to regulate a rotation speed of the at least one electric motor, wherein the additional motor controller receives, for regulating the rotation speed of the at least one electric motor, as an input signal an actual rotary speed signal from the at least one electric motor and as a target value a rotary speed target value for the at least one electric motor, wherein the additional motor controller generates as output signal the target torque.

* * * * *